United States Patent
Tanaka et al.

(10) Patent No.: US 6,898,495 B2
(45) Date of Patent: May 24, 2005

(54) PARKING ASSIST SYSTEM

(75) Inventors: Yuu Tanaka, Aichi-ken (JP); Yoshifumi Iwata, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 8 days.

(21) Appl. No.: 10/226,154

(22) Filed: Aug. 23, 2002

(65) Prior Publication Data

US 2003/0058337 A1 Mar. 27, 2003

(30) Foreign Application Priority Data

Aug. 24, 2001 (JP) ........................................ 2001-254091

(51) Int. Cl.$^7$ ................................................ H04N 7/00
(52) U.S. Cl. ................... 701/36; 348/116; 348/149; 345/1; 345/781; 382/104
(58) Field of Search .................. 701/36–41; 348/116, 348/149, 16, 148, 135; 382/104; 345/7, 781

(56) References Cited

U.S. PATENT DOCUMENTS

| | | | |
|---|---|---|---|
| 6,539,288 B2 | * | 3/2003 | Ishida et al. .................... 701/1 |
| 2002/0128750 A1 | * | 9/2002 | Kakinami et al. ............. 701/1 |

FOREIGN PATENT DOCUMENTS

| | | |
|---|---|---|
| EP | 1 038 734 A1 | 9/2000 |
| JP | 59-114139 A | 7/1984 |
| JP | 2000-229547 A | 8/2000 |

* cited by examiner

Primary Examiner—Marthe Y. Marc-Coleman
(74) Attorney, Agent, or Firm—Burns, Doane, Swecker & Mathis, L.L.P.

(57) ABSTRACT

A parking assist system for a driver to confirm a relationship between relative positions to obstacles and one's own vehicle. A top plane creating image 7B in which a circumstance situation of one's own vehicle is indicated from a point of upward view is created based on a backward image of one's own vehicle taken by a CCD camera and displayed on a screen of a display. A mobile locus including a marker G of one's own vehicle, a marker, a parking path, and a current position is displayed on the top plane creating image in a duplicate way.

22 Claims, 10 Drawing Sheets

PARKING ASSIST SYSTEM

CROSS REFERENCE TO RELATED APPLICATIONS

This application is based on and claims priority under 35 U.S.C. §119 with respect to Japanese Application 2001-254091, filed on Aug. 24, 2001, the entire content of which is incorporated herein by reference.

BACKGROUND OF THE INVENTION

1. Field of Invention

The present invention relates to a parking assist system for assisting parking operation of a driver by using a picture image displayed on a screen.

2. Description of Related Art

Conventionally, there is a "backward supervisory monitor system of a vehicle" which is described in a Japanese Patent Laid-Open Publication No. SHOWA 59-114139, for example, as a parking assist system for assisting parking operation using a picture image displayed on a screen. For the backward direction of one's own vehicle, such a "backward supervisory monitor system of a vehicle" stores in beforehand a marker position data corresponding to rudder angle data of a tire, retrieves the marker position data corresponding to the rudder angle data if the rudder angle data are input from a tire direction sensor, and displays a marker column on the screen of a monitor display in which the backward portion of one's own vehicle is displayed.

That is to say, as shown in FIGS. 10($a$), ($b$), and ($c$), the markers 101 which are biased along an anticipated backward course of one's own vehicle as well as an obstacle (a parked vehicle 102 in FIG. 10) are displayed on a screen 100 of the monitor display close to a driver's seat, and the backward direction of one's own vehicle is indicated clearly, thus it comes to possible to reduce a burden of driving for parking at the time of putting into the garage, column parking, and so forth.

However, for seeing a picture image displayed in the screen 100 of the monitor display and seeing directly with the naked eye, the senses of feeling the distance do not work in the same way. Further, since the picture image displayed on the screen 100 of the monitor display is the picture image from a point of view of a camera which is set in the backward direction of one's own vehicle, there is a limitation for the range of seeing through the picture image displayed in the screen 100 of the monitor display. Further, when it is started parking operation by moving back after stopping steering, for example, the direction of the picture image which is shown in the screen 100 of the monitor display changes as the direction of one's own vehicle changes. In this way, in the conventional "backward supervisory monitor system of a vehicle," it has not been easy to confirm the relationship (the distance, angle, etc, to one's own vehicle) between relative positions to such an obstacle as a parked vehicle, a road shoulder, a guardrail, a wall, and an electric poll from the picture image of the screen 100 of the monitor display.

For that reason, the present invention is invented to solve above-mentioned problems. In the parking assist system, it is an object of the present invention to make it easy for a driver to confirm the relationship between relative positions to the obstacle and one's own vehicle.

SUMMARY OF THE INVENTION

One of the aspect of the present invention is characterized in that a parking assist system for displaying an anticipated course calculated from a steering rudder angle of one's own vehicle on a picture image in a duplicate way in which a circumstance situation of one's own vehicle is displayed, includes image creating means for creating a top plane creating image based on the aforementioned picture image in which the aforementioned circumstance situation is indicated from a point of upward view, first input means for inputting a parking target point which one's own vehicle targets based on the aforementioned picture image, first calculating means for calculating a parking path from a current position of one's own vehicle to the aforementioned parking target point, and displaying means for displaying the aforementioned parking path on the aforementioned top plane creating image in a duplicate way.

That is to say, in the parking assist system of the present invention, while the image creating means creates the top plane creating image, in which the circumstance situation of one's own vehicle is indicated from a point of upward view, is created based on the picture image in which the circumstance situation of one's own vehicle is taken, since the parking path of one's own vehicle is displayed in the top plane creating image in a duplicate way by the displaying means after the first calculating means calculates the parking path from the current position of one's own vehicle to the parking target point if the parking target point, in which one's own vehicle is preferably parked, is input by the first calculating means, it is possible to confirm or grasp more easily the relationship between relative positions to the obstacles.

Another aspect of the parking assist system according to the invention, the aforementioned image creating means updates the aforementioned top plane creating image based on a change of the aforementioned picture image caused by one's own vehicle's moving.

That is to say, in the parking assist system of the present invention, when one's own vehicle moves, based on the change of the picture image due to one's own vehicle's moving, if the image creating means updates the top plane creating image and further if the displaying means displays the parking path of one's own vehicle in a duplicate way for the updated top plane creating image, the top plane creating image, in which the circumstance situation of one's own vehicle is indicated from a point of upward view, is replaced with the image in accordance with the current situation, thus it comes to be possible to grasp more easily the relationship between relative positions to the obstacles.

Further aspect of the parking assist system according to the invention, the aforementioned one's own vehicle includes a second input means for inputting an avoidance point which the aforementioned one's own vehicle avoids and the aforementioned first calculating means calculates a parking path to the aforementioned parking target point by avoiding the aforementioned avoidance point.

Further, in the parking assist system of the present invention, if the first calculating means calculates the parking path by considering the avoidance point which is input by the second input means, the parking path becomes the path in which the avoiding point which one's own vehicle preferably avoids at the time of driving for parking is considered, thus enabling the confirmation more easily of the relationship between relative positions to the obstacles.

Further aspect of the parking assist system according to the invention, a second calculating means for calculating a mobile locus of the aforementioned one's own vehicle is further included and the aforementioned displaying means displays the aforementioned mobile locus on the aforementioned top plane creating image in a duplicate way.

Further, in the parking assist system of the present invention, if the second calculating means calculates the mobile locus of one's own vehicle and further if the displaying means displays the mobile locus in a duplicate way for the top plane creating image, the mobile locus of one's own vehicle is displayed in addition to the parking path of one's own vehicle in the top plane creating image in which the circumstance situation of one's own vehicle is indicated from a point of upward view and it is possible to recognize the difference between the parking path of one's own vehicle and the mobile path of one's own vehicle, thus it comes to be possible to grasp more easily the relationship between relative positions to the obstacles.

Further aspect of the parking assist system according to the invention, the aforementioned displaying means displays a current position of the aforementioned one 's own vehicle by incorporating with the aforementioned mobile locus.

Further, in the parking assist system of the present invention, in the case that the displaying means displays the current position of one's own vehicle by being incorporated with the mobile locus of one's own vehicle, it is possible by taking a look to recognize the distance from the obstacles at the present time to one's own vehicle and the angle of one's own vehicle towards the obstacles at the present time, thus it comes to be possible to grasp more easily the relationship between relative positions to the obstacles.

Further aspect of the parking assist system according to the invention, an image processing means for converting to a top plane converting image in which the aforementioned picture image is viewed from a point of upward view is included and the aforementioned displaying means displays the aforementioned top plane converting image instead of the aforementioned top plane creating image.

The invention further characterized in that the parking assist system includes an image processing means for converting to a top plane converting image in which the aforementioned picture image is viewed from a point of upward view and the aforementioned displaying means displays by means of a combination of the aforementioned top plane creating image and the aforementioned top plane converting image.

Further, in the parking assist system of the present invention, the image processing means for converting into top plane converting image in which the picture image is viewed from a point of upward view is included, in the case that the displaying means displays the top plane converting image instead of the top plane creating image or displays by means of a combination of the top plane creating image and the top plane converting image, the image is converted into the top plane converting image in which the whole or a part of the top plane creating image in which the circumstance situation of one's own vehicle is indicated from a point of upward view is a real picture image, it is possible to replace a part or the whole of the top plane creating image in which the circumstance situation of one's own vehicle is indicated from a point of upward view, thus it comes to be possible to grasp more easily the relationship between relative positions to the obstacles.

Further aspect of the parking assist system according to the invention, the aforementioned displaying means displays the aforementioned top plane creating image and the aforementioned picture image simultaneously by splitting a screen.

The aforementioned displaying means displays the aforementioned top plane creating image and the aforementioned picture image or displays the aforementioned picture image and a combined image of the aforementioned top plane creating image and the aforementioned top plane converting image simultaneously by splitting the screen.

Further, in the parking assist system of the present invention, in the case that the displaying means displays the image as well as the top plane creating image at the same time by splitting the screen or in the case that the picture image and a combined image of the top plane creating image and the top plane converting image are displayed at the same time by splitting the screen, it is possible to see the image for inputting the parking target point and the avoidance point and the image in which the anticipated course calculated from the steering rudder angle of one's own vehicle is displayed in a duplicate way with reference to the top plane creating image or a combined image of the top plane creating image and the top plane converting image, thus it comes to be possible to grasp more easily the relationship between relative positions to the obstacles.

BRIEF DESCRIPTION OF THE DRAWINGS

The foregoing and further objects, features and advantages of the invention will become apparent from the following description of the preferred embodiments with reference to the accompanying drawings, wherein like numerals are used to represent like elements and wherein.

DETAILED DESCRIPTION OF THE PREFERRED EMBODIMENT

Figure 5:
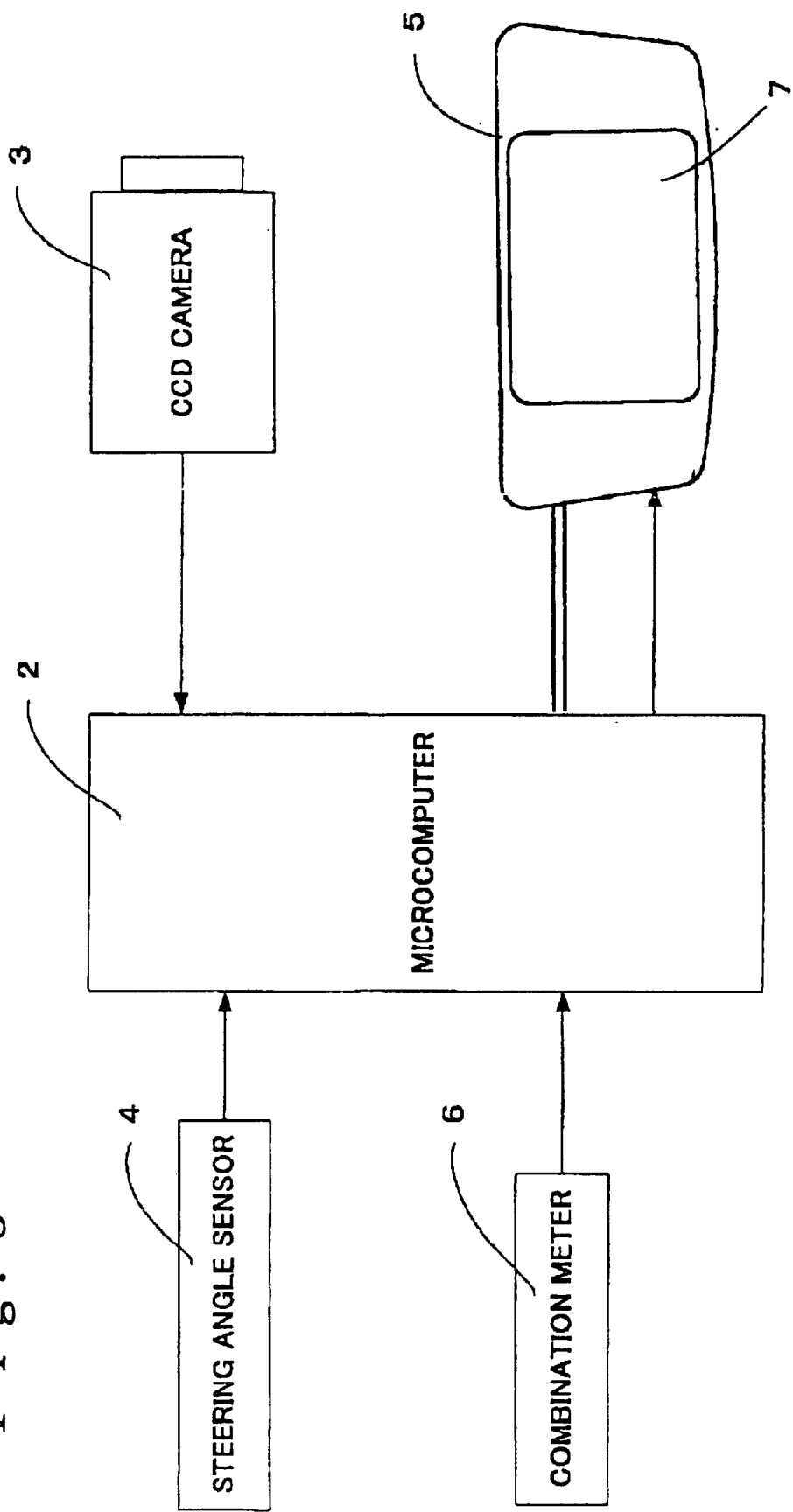
FIG. 5 is a block diagram of the parking assist system of the present embodiment.

The embodiments of the present invention are explained hereinafter with reference to the drawings. FIG. 5 is a block diagram of a parking assist system of the embodiment. The parking assist system of the present embodiment includes a microcomputer 2, a CCD camera 3, a steering angle sensor 4, a display 5, and a combination meter 6 as indicated in FIG. 5.

At this point, the microcomputer 2 switches ON or OFF the CCD camera 3, and also outputs a picture image signal from the CCD camera 3 to the display 5. Further, the microcomputer 2 functions in accordance with a flowchart of FIG. 4, which is explained in the latter part of the specification, and corresponds to the "first calculating means," the "second calculating means," an "image creating means," and an "image processing means" respectively.

Further, the CCD camera 3 is mounted in the back portion of the vehicle, transforms a taken picture to a picture image signal, and then outputs it to the microcomputer 2. At this point, the picture image which is output to the microcomputer 2 is reversed in order to show on the display in the same way as to see back by means of a room mirror (mirror image).

Further, the steering angle sensor 4 is mounted inside a steering wheel and detects a steering angle. Then, the detected steering angle is output to the microcomputer 2 as a steering angle signal.

Further, the display 5 shows a picture image, which has been pictured by means of the CCD camera 3, on a screen 7 through the microcomputer 2 and corresponds to a "displaying means." The screen 7 is a touch panel and functions as the "first inputting means" and the "second inputting means."

Further, the combination meter 6 detects the speed of the vehicle. Then, the detected speed of the vehicle is output to the microcomputer 2 as a vehicle speed signal. Accordingly, it comes to be possible for the microcomputer 2 to calculate the distance of a migration length.

Figure 2:
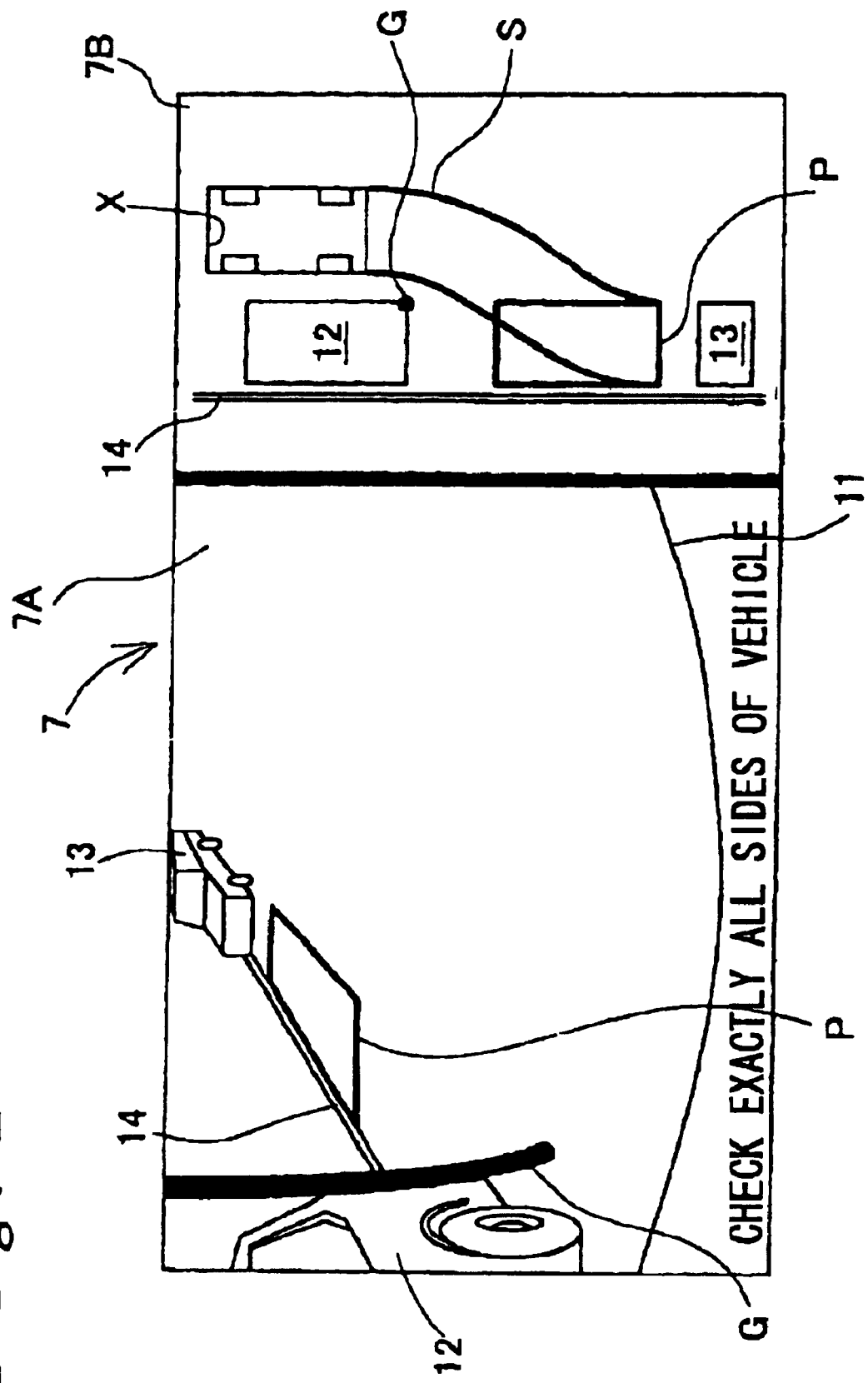
FIG. 2 illustrates one example of a screen of the display which is displayed at the time of inputting a parking target point and an avoidance point by way of the parking assist system of the present invention.
Figure 4:
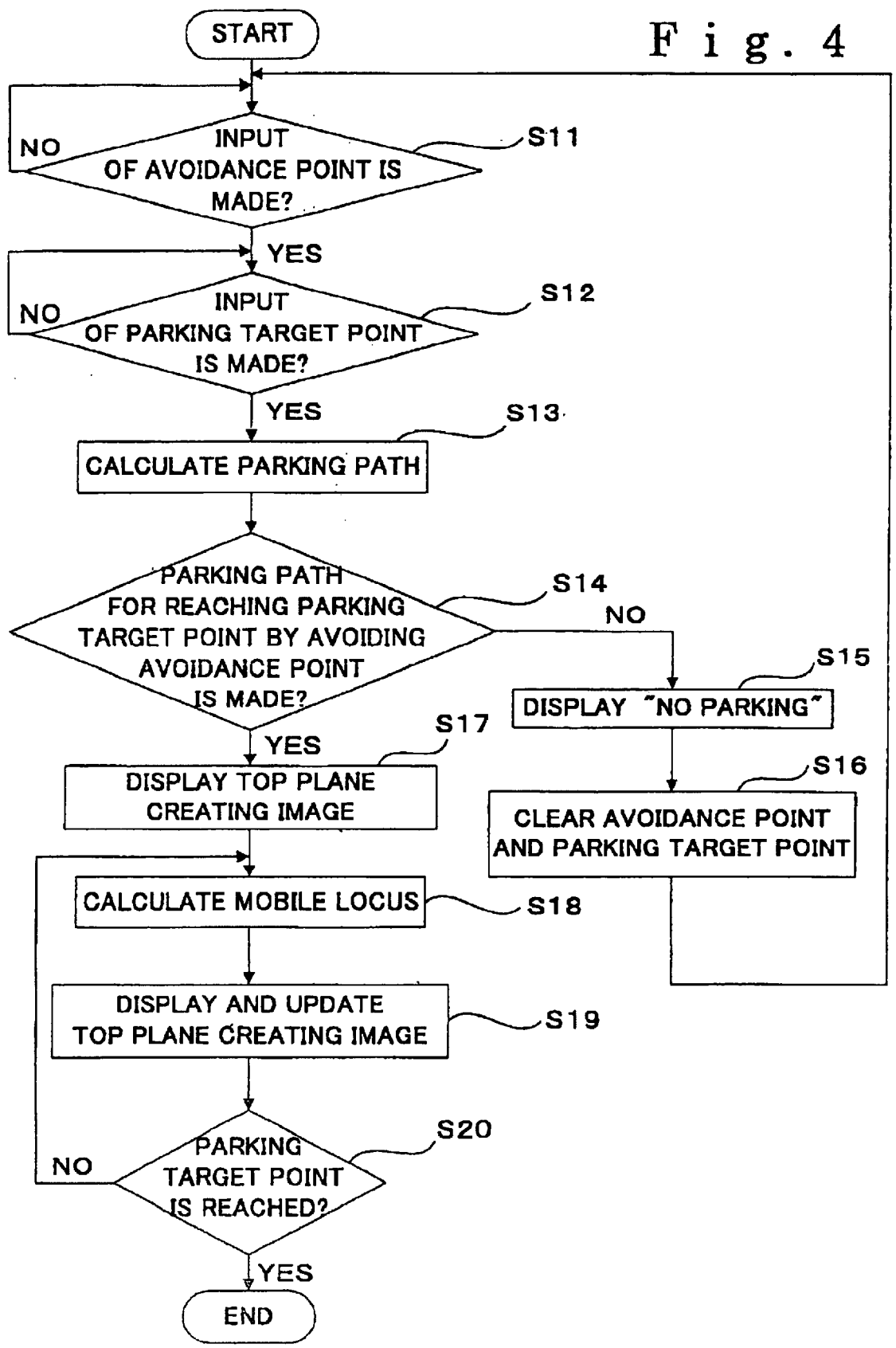
FIG. 4 is a flowchart of the parking assist system of the present invention.

In the second place, the operation and function of the parking assist system of the present invention is explained based on the flowchart of FIG. 4. At this place, the case of column parking, in which one's own vehicle is parked in a space between a forward parking vehicle and a backward parking vehicle, is explained. Therefore, for example, if one's own vehicle is stopped in the diagonally forward direction of the forward parking vehicle in order to park one's own vehicle in a column way, a back picture image 7A of one's own vehicle is displayed on the left side of the screen 7 of the display 5 as indicated in FIG. 2. At this stage, a bumper back end 11 of one's own vehicle, a forward parking vehicle 12, a backward parked vehicle 13, and a road shoulder edge 14 are displayed in the picture image 7A which is displayed on the left side of the screen 7 of the display 5. At this point, the fact that one's own vehicle has stopped is judged by the vehicle speed signal, which is output to the microcomputer 2 from the combination meter 6.

Then, the parking assist system of the present embodiment judges whether or not an input of an avoidance point is made at step S11 of FIG. 4. At this point, the input of the avoidance point is made by touching directly the left side of the screen 7 of the display 5. Then, a marker G as the avoidance point is displayed using a vertical line as indicated in FIG. 2. At this stage, when it is judged that the input of the avoidance point has been made (S11: YES), step S12 is performed. On the other hand, when it is not judged that the input of the avoidance point has been made (S11: NO), step S11 is backed and the aforementioned judge is repeated.

At this stage, the avoidance point (the marker G) is adjusted to the back end of the forward parking vehicle 12 in FIG. 2.

At step S12, it is judged whether or not an input of a parking target point is made. At this point, the input of the parking target point is made by touching directly the left side of the screen 7 of the display 5. At this stage, a marker P of the parking target point is displayed by a frame as indicated in FIG. 2. At this stage, when it is judged that the input of the parking target point has been made (S12: YES), step S13 is performed. On the other hand, when it is not judged that the input of the parking target point has been made (S12 NO), step S12 is backed and the aforementioned judge is repeated. In this place, in FIG. 2, the parking target point (the marker P) is adjusted in such a way that it can be parked in parallel with the road shoulder edge 14 in a space between the forward parking vehicle 12 and the backward parking vehicle 13.

At step S13, a parking path in which one's own vehicle reaches the parking target point by avoiding the avoidance point is calculated (referring to the "first calculating means"). At this time, picture images displayed on the left side of the screen 7 of the display 5, the avoidance point which has been input at step S11, and parking target point which has been input at step S12 are referred.

In this place, the meaning of the parking path of FIG. 2 is the path for parking one's own vehicle by avoiding the back end of the forward parking vehicle 12 and also arranging it in parallel with the road shoulder edge 14 in a space between the forward parking vehicle 12 and the backward parking vehicle 13.

Further, after the parking path has been calculated at step S13, it is judged whether or not the parking path exists at step S14. At this step, when it is not judged that the parking path exists (S14: NO), step S15 is performed, and "No parking is allowed" is displayed on the left side of the screen 7 of the display 5. Further, step S16 is performed, and the avoidance point which has been input at step S11 and the parking target point which has been input at step S12 are cleared, and then step S11 is backed.

On the other hand, when it is judged that the parking path exists (S14: YES), step S17 is performed, an image of a top plane view which is seen from a higher point by means of computer graphics (referring to an "image creating means") based on the back picture image 7A (FIG. 2) of one's own vehicle which has been captured by the CCD camera 3 while one's own vehicle has been parking is created, and then a top plane creating image 7B therefrom is displayed on the right side of the screen 7 of the display 5 as indicated in FIG. 2. At this point, the forward parking vehicle 12, the backward parking vehicle 13, the road shoulder edge 14, the marker G of the avoidance point, the marker P of the parking target point, the parking path S and so forth are displayed in a duplicate way in the top plane creating image 7B.

Then, after the top plane creating image 7B has been created and displayed at step 517, step S18 is performed, and then a mobile locus of the one's own vehicle is calculated (referring to the "second calculating means"). At this time, a steering rudder angle which can be obtained from the steering rudder angle signal which is output to the microcomputer 2 from the steering angle sensor 4 and a mobile distance which is calculated from a vehicle speed signal which is output to the microcomputer 2 from the combination meter 6 are used.

Then, at step S19, the mobile locus of one's own vehicle which is calculated at step S18 for the top plane creating image 7B on the right side of the screen 7 of the display 5 is updated and then displayed. In FIG. 2, since FIG. 2 indicates that one's own vehicle is parked in the diagonally forward direction of the forward parking vehicle 12, a current position X of one's own vehicle is only displayed in a duplicate way on the top plane creating image 7B on the right side of the screen 7 of the display 5 as the mobile locus of one's own vehicle.

Further, at step S20, it is judged whether or not one's own vehicle has reached the parking target point. At this time, the picture image 7A which is displayed on the left side of the screen 7 of the display 5, the parking target point which is input at step S12, the mobile locus of one's own vehicle which has been calculated at step S18 and so forth are referred. In this place, when it is not judged that one's own vehicle has reached the parking target point (S20: NO), step S18 is backed, and the procedures after step S18 are repeated.

Figure 1:
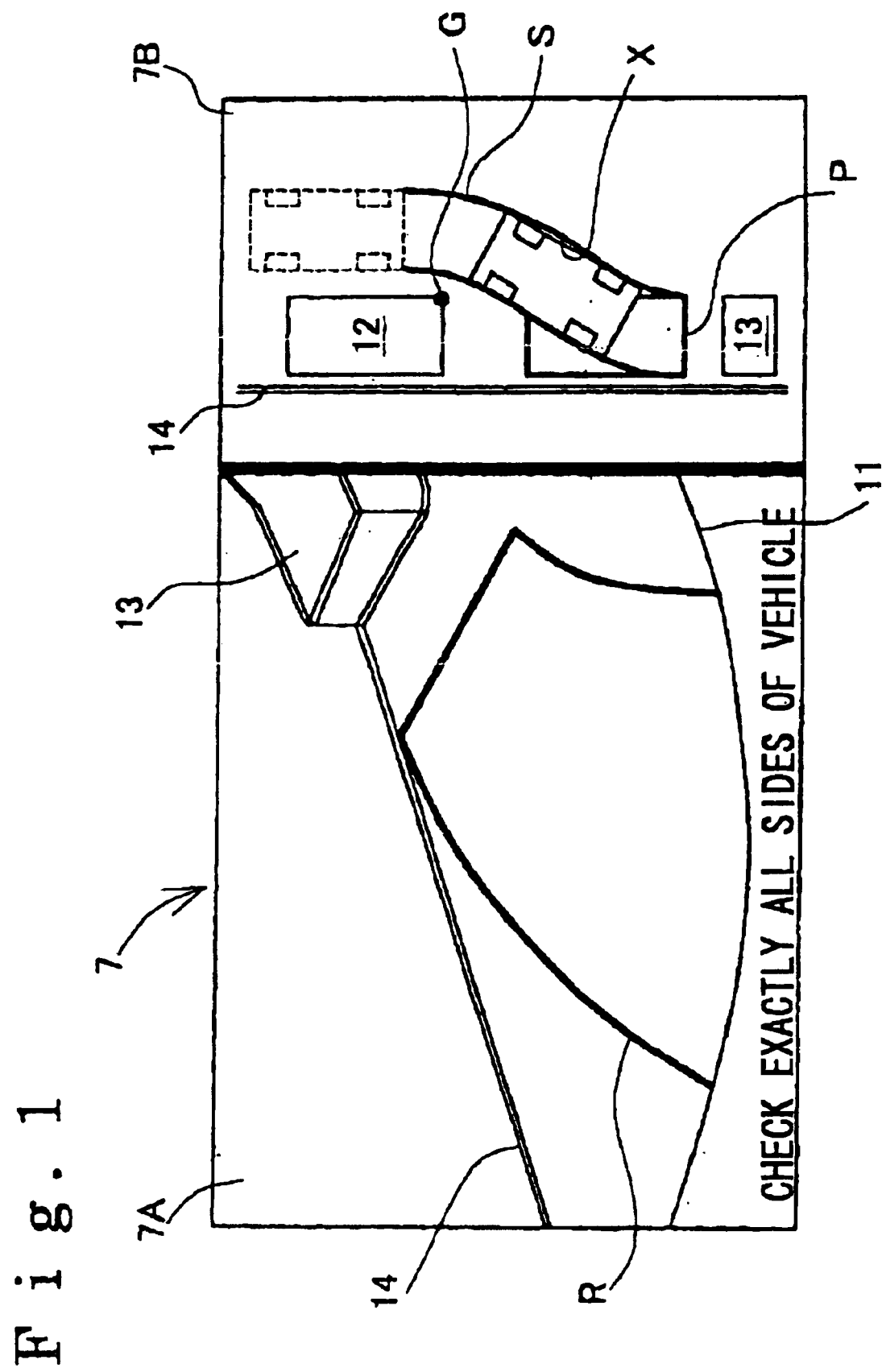
FIG. 1 illustrates one example of a screen of a display which is displayed at the time of one's own vehicle's moving back for driving column parking by way of a parking assist system of the present invention.

To give an actual example, when column parking is made by one's own vehicle's moving back, the mobile locus of one's own vehicle is calculated again at step 518 and then the current position X of the top plane creating image 7B on the right side of the screen 7 of the display 5 is updated and displayed as indicated in FIG. 1. Further, although the mobile locus of one's own vehicle is also updated and displayed, a parking path S and the mobile locus are duplicated with each other in FIG. 1. However, the mobile locus of one's own vehicle and the parking path S are displayed using different colors and thus it is possible to identify by the top plane creating image 7B on the right side of the screen 7 of the display 5.

Here, when column parking is made by one's own vehicle's moving back, the direction of the picture image 7A on the left side of the screen 7 of the display 5 changes as the direction of one's own vehicle changes as indicated in FIG. 1. At this time, an anticipated course of the one's own vehicle is calculated based on the steering rudder angle detected by the steering angle sensor 4 and then an anticipated course R is updated and displayed on the picture image 7A of the left side of the screen 7 of the display 5.

On the other hand, when it is judged that one's own vehicle has reached the parking target point (S20: YES), the flowchart of FIG. 4 is ended. Such a case means that the column parking due to one's own vehicle's moving back has ended and then the screen 7 of the display 5 is displayed as indicated in FIG. 3.

Figure 3:
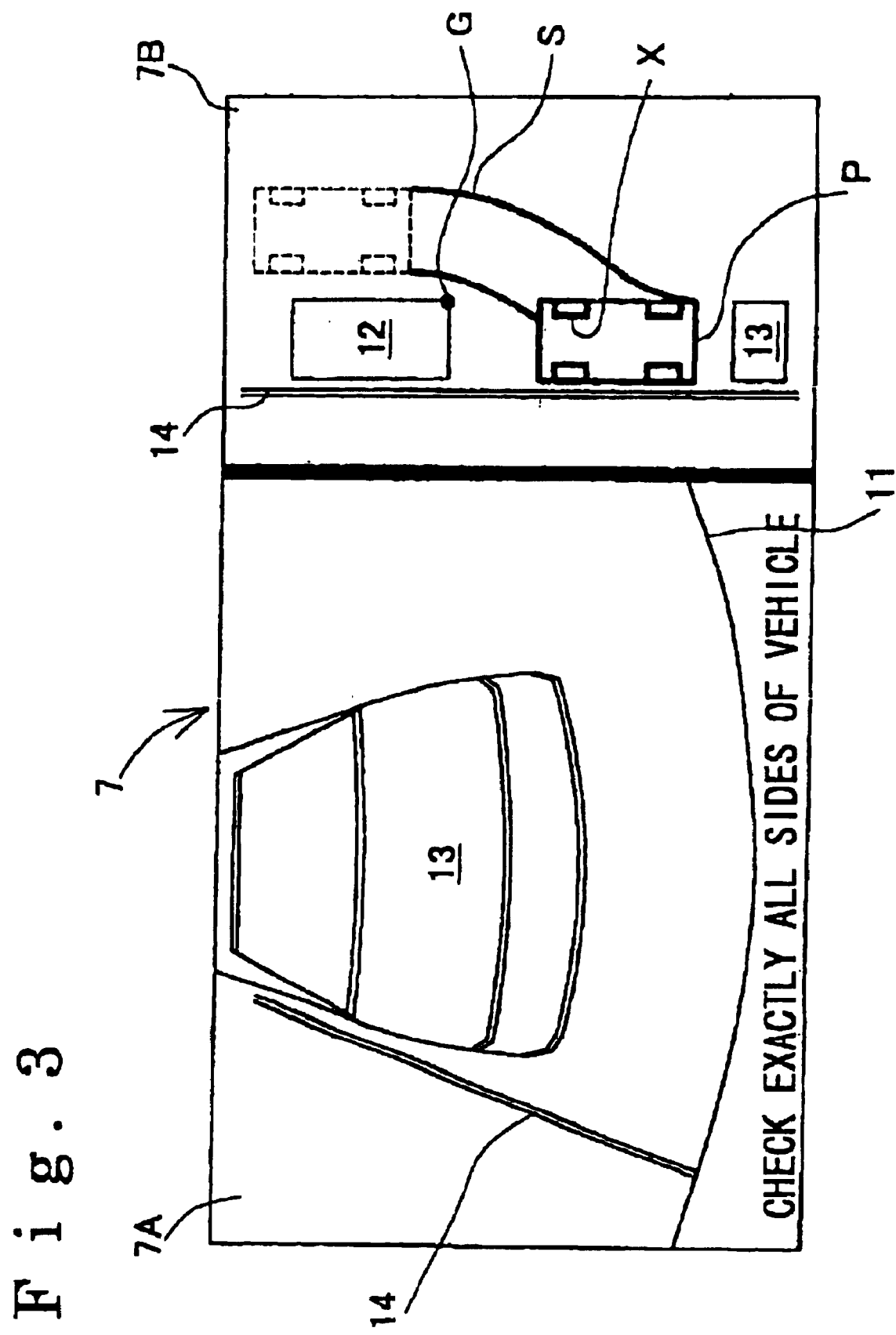
FIG. 3 illustrates one example of a screen of the display which is displayed at the time of finishing one's own vehicle's moving back for driving column parking by way of the parking assist system of the present invention.

As explained in the aforementioned explanation in detail, according to the parking assist system of the present embodiment, the picture image 7A in the back direction of one's own vehicle is displayed on the left side of the screen 7 of the display 5 by taking an image by the CCD camera 3 as indicated in FIGS. 1 to 3. Then, the top plane creating image 7B, in which circumstance conditions of one's own vehicle are indicated from a point of upward view, is created (S17 of FIG. 4) based on the picture image 7A (FIG. 2) in the back direction of one's own vehicle by taking an image by the CCD camera 3.

On the other hand, as shown in FIG. 2, if the parking target point, in which one's own vehicle is preferably stopped continuously, is input by means of the touch panel of the left side of the screen 7 of display 5 through the marker P of the parking target point based on the picture image 7A in the back direction of one's own vehicle by taking an image using the CCD camera 3 (S12 of FIG. 4), the parking path S from the current position of one's own vehicle to the parking target point is calculated (S13 of FIG. 4). Then, as indicated in FIGS. 1 to 3, the parking path S of one's own vehicle is shown in the top plane creating image 7B in a duplicate way on the right side of the screen 7 of the display 5, thus it comes to be possible to grasp the relationship between relative positions to obstacles such as the forward parking vehicle 12, the backward parking vehicle 13, and the road shoulder edge 14.

Further, according to the parking assist system of the present invention, the point, which one's own vehicle preferably avoids at the time of driving for parking, is input through the marker G of the avoidance point by means of the touch panel on the left side of the screen 7 of the display 5 (S11 of FIG. 4), the parking path S from the current position of one's own vehicle to the parking target point is calculated by considering such an avoidance point at step S13 of FIG. 13, and the avoidance point, which one's own vehicle preferably avoids at the time of driving for parking, is considered in the parking path S, thus it comes to be possible to grasp the relationship between relative positions to obstacles such as the forward parking vehicle 12, the backward parking vehicle 13, and the road shoulder edge 14.

Further, according to the parking assist system of the present invention, the mobile locus of one's own vehicle is calculated from the steering rudder angle of one's own vehicle and the mobile distance of one's own vehicle (S15 of FIG. 4), the mobile locus is then shown in the top plane creating image 7B in a duplicate way on the right side of the screen 7 of the display 5, the mobile locus of one's own vehicle and the parking path S of one's own vehicle as well are shown in the top plane creating image 7B, in which the circumstance condition of one's own vehicle is indicated from a point of upward view, using different colors, and it is possible to identify the difference between the parking path S of one's own vehicle and the mobile locus of the one's own vehicle, thus it comes to be possible to grasp the relationship between relative positions to obstacles such as the forward parking vehicle 12, the backward parking vehicle 13, and the road shoulder edge 14.

Further, according to the parking assist system of the present invention, as indicated in FIGS. 1 to 3, in the top plane creating image 7B displayed on the right side of the screen 7 of the display 5, the current position X of one's own vehicle is shown in the mobile locus by being included, and it is possible by taking a look at the top plane creating image 7B to identify intervals among one's own vehicle and the obstacles (the forward parking vehicle 12, the backward parking vehicle 13, road shoulder edge 14, and so forth) and the angle of one's own vehicle to the obstacles (the forward parking vehicle 12, the backward parking vehicle 13, road shoulder edge 14, and so forth) at the moment, thus it comes to be possible to grasp the relationship between relative positions to obstacles such as the forward parking vehicle 12, the backward parking vehicle 13, and the road shoulder edge 14.

Further, according to the parking assist system of the present invention, as indicated in FIGS. 1 to 3, in the screen 7 of the display 5, the picture image 7A and the top plane creating image 7B are displayed at the same time by splitting the screen, it is possible to see, with reference to the top plane creating image 7B, the picture image 7A (FIG. 2) for inputting the parking target point and the avoidance point and the picture image 7A (FIGS. 1 and 3) in which the anticipated course R calculated from the steering rudder angle of one's own vehicle is displayed in a duplicate way, thus it comes to be possible to grasp the relationship between relative positions to obstacles (the forward parking vehicle 12, the backward parking vehicle 13, the road shoulder edge 14, and so forth).

At this place, the present invention is not limited to the aforementioned embodiment of the present invention, but it is possible to apply to various modifications within the scope of the purport.

For example, although the parking assist system of the present embodiment is explained for the case of column parking in which one's own vehicle is parked in the space between the forward parking vehicle 12 and the backward parking vehicle 13, the parking assist system of the present embodiment is capable of being applied to the case of a garage (parallel parking).

Further, in the parking assist system of the present embodiment, as indicated in FIG. 2, although, based on the picture image 7A in the backward direction of one's own vehicle taken by the CCD camera 3, the parking target point in which one's own vehicle is preferably parked continuously is input by means of the touch panel on the left side of the screen 7 of the display 5 through the marker P of the parking target point (S11 of FIG. 4) and the avoidance point which one's own vehicle preferably avoids is input by means of the touch panel on the left side of the screen 7 of the display 5 through the marker G of the avoidance point (S12 of FIG. 4), it may be possible to input the parking target point and the avoidance point by means of a switch working together with the marker P of the parking target point and the marker G of the avoidance point.

Figure 8:
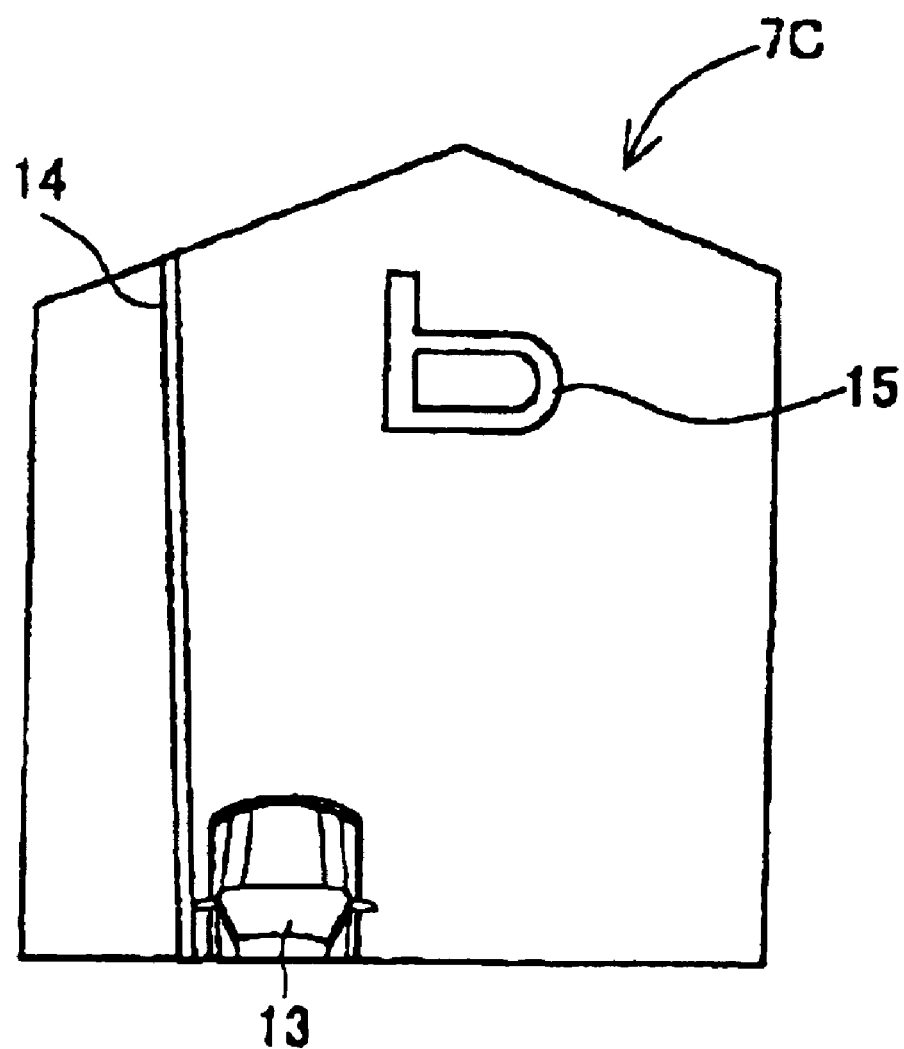
FIG. 8 illustrates one example of a top plane converting image by way of the parking assist system of the present embodiment.
Figure 9:
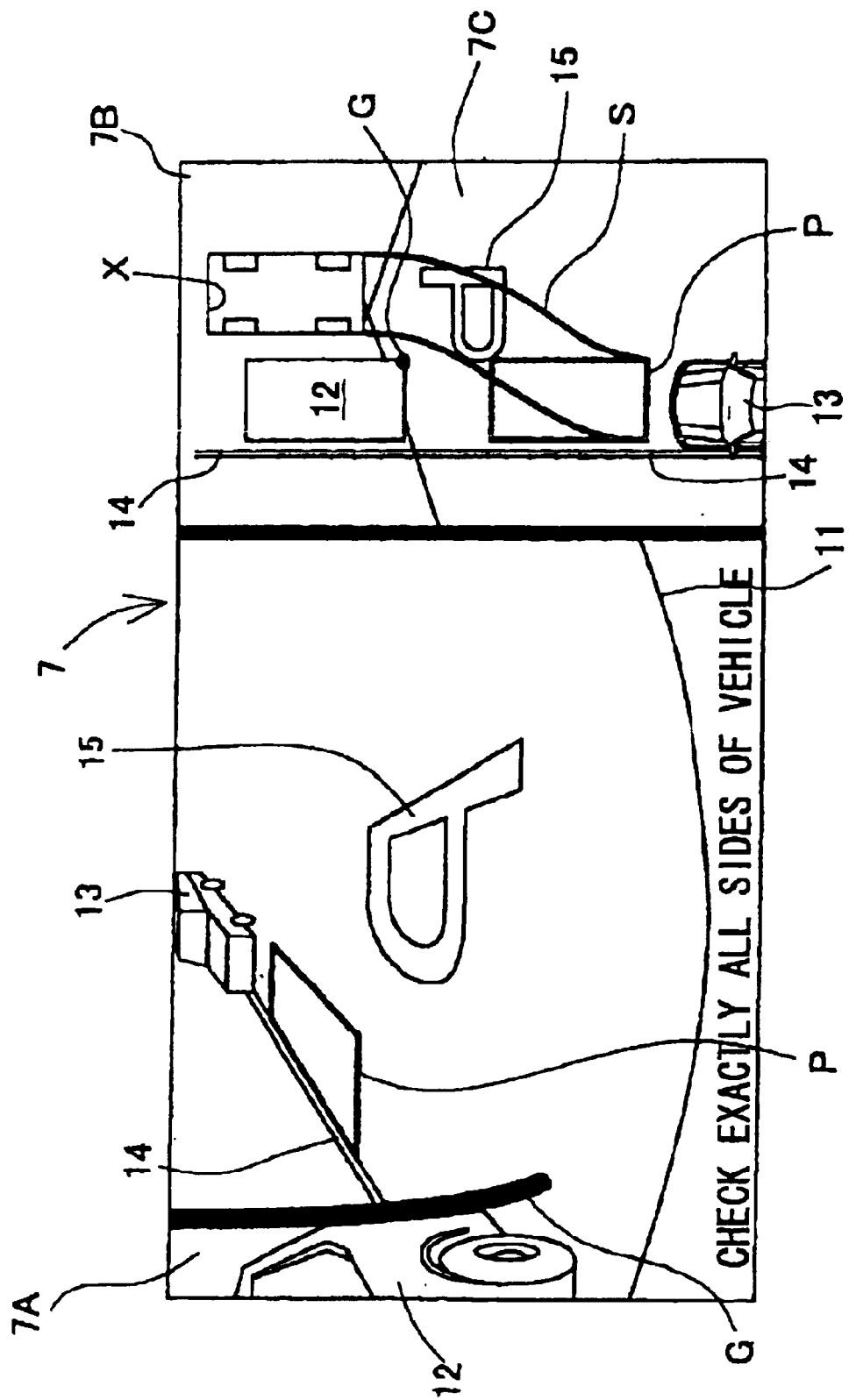
FIG. 9 illustrates one example of a screen of the display in which the top plane converting image is incorporated with a part of the top plane creating image by way of the parking assist system of the present embodiment.
Figure 10:
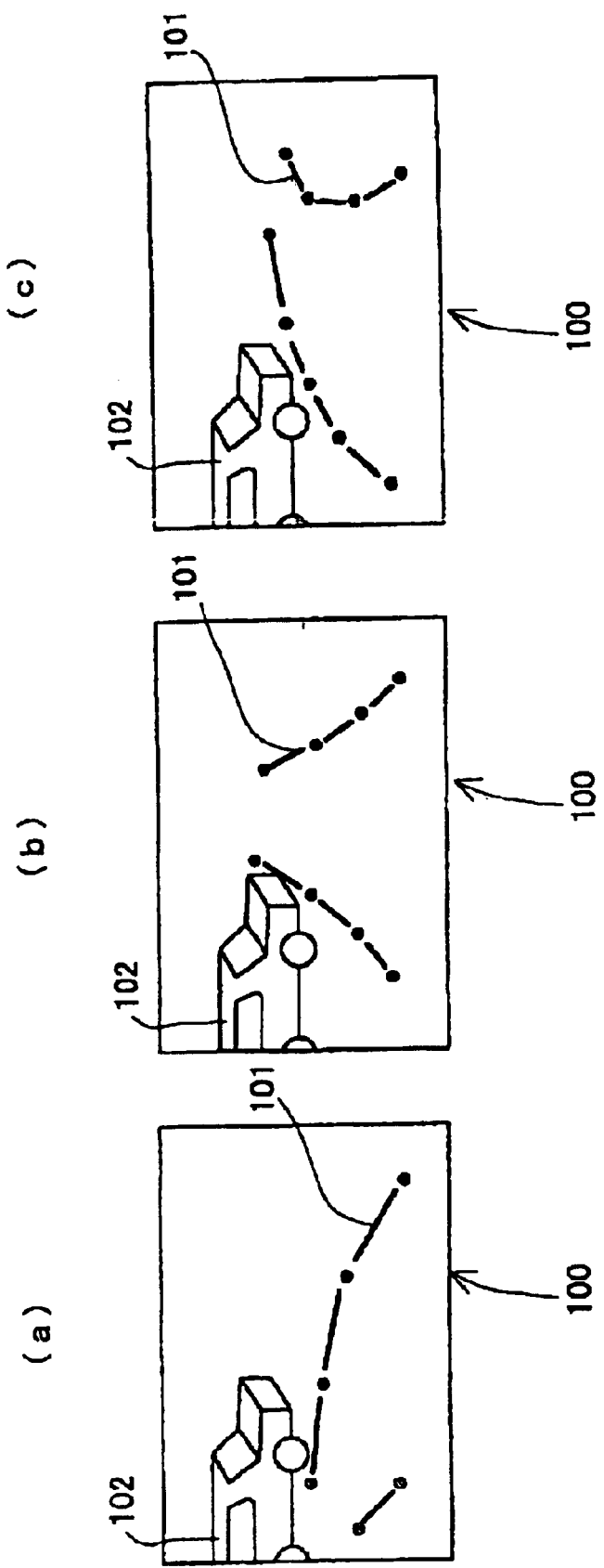
FIG. 10 illustrates displaying examples of the screen of a monitor display by way of a conventional "backward supervisory monitor device of an automobile vehicle."

Further, in the parking assist system of the present embodiment, as indicated in FIGS. 1 to 3, although the top plane creating image 7B which is shown in the right side of the screen 7 of the display 5 is created using computer graphics, it is possible to create a top plane converting image 7C (FIG. 8) by image-processing a back picture image 16 (FIG. 7) of one's own vehicle taken by the CCD camera 3 by means of the microcomputer 2 (referring to an "image processing means") and then display it by incorporating the top plane converting image 7C (FIG. 8) to the top plane creating image 7B as shown in FIG. 9.

Figure 6:
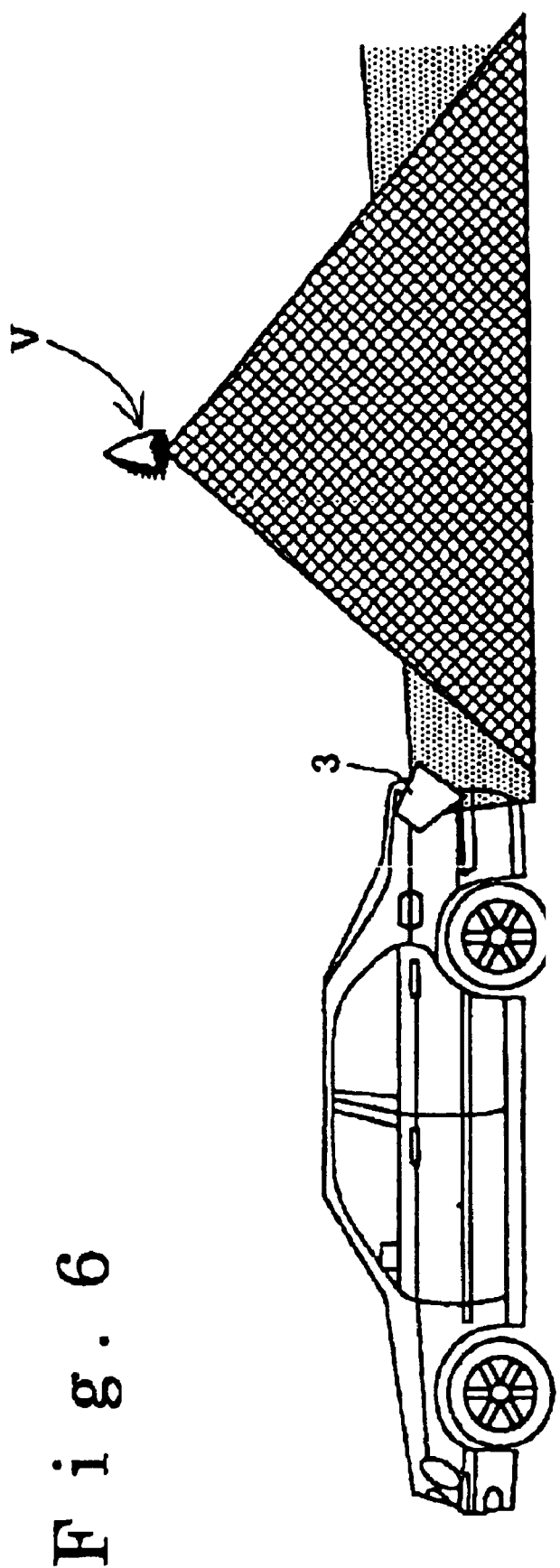
FIG. 6 illustrates each of the view range and the view point of a top plane converting image and an image taken by a CCD camera by way of the parking assist system of the present embodiment.
Figure 7:
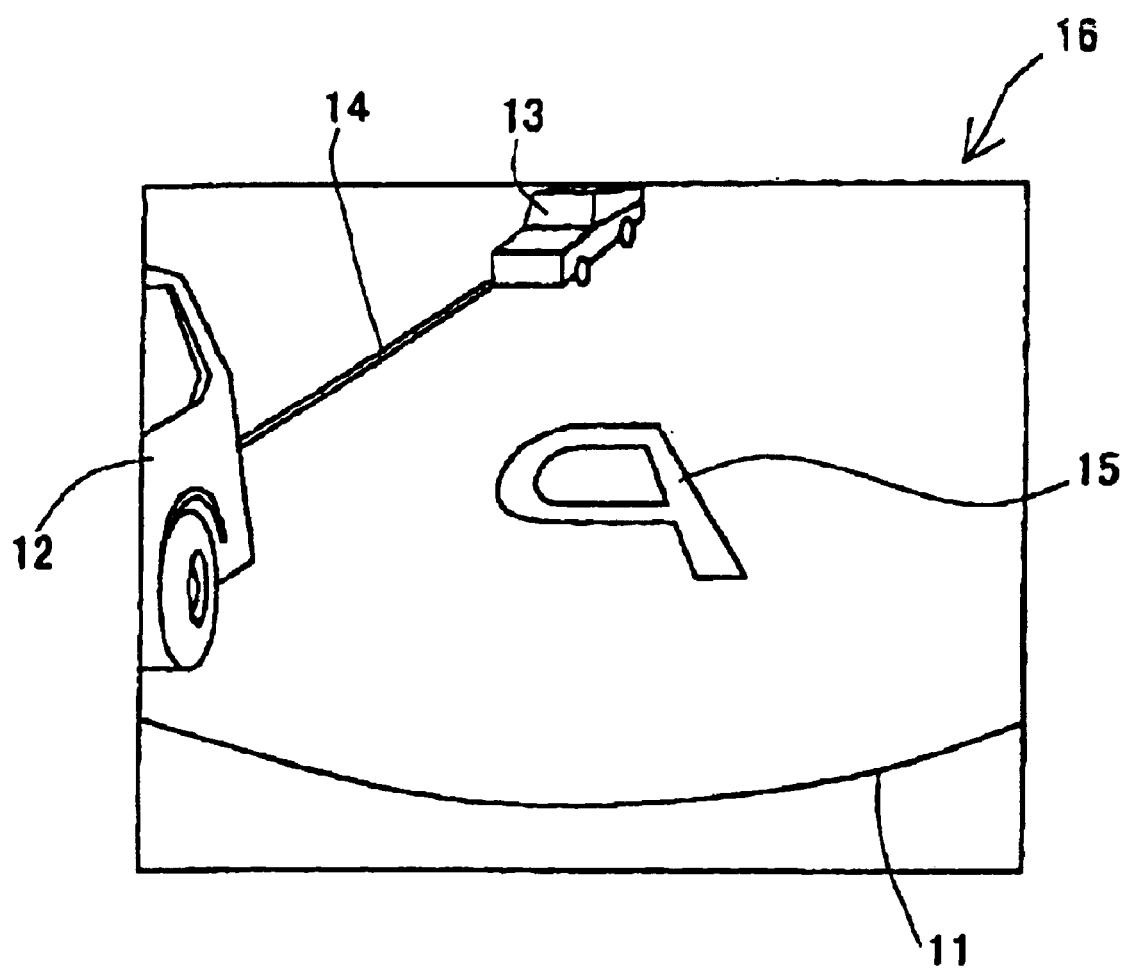
FIG. 7 illustrates one example of a picture image taken by the CCD camera while one's own vehicle stops by way of the parking assist system of the present embodiment.

In this place, the top plane converting image 7C means that the back picture image 16 (FIG. 7) of one's own vehicle taken by the CCD camera 3 is converted to an image seen from a point of upward view V as shown in FIG. 6. At this point, as shown in FIG. 7, the bumper back end 11 of one's own vehicle, the forward parking vehicle 12, the backward parking vehicle 13, the road shoulder edge 14, and a traffic sign 15 of a road are taken in the back picture image 16 of one's own vehicle taken by the CCD camera 3. Due to the limitation of the view field of the CCD camera 3, however, the backward parking vehicle 13, the road shoulder edge 14, and the traffic sign 15 of the road are taken in the top plane converting image 7C of FIG. 8.

That is to say, as shown in FIG. 9, if the top plane converting image 7C is displayed by being incorporated with the top plane creating image 7B on the right side of the screen 7 of the display 5, the top plane converting image 7C, in which a part of the top plane creating image 7B in which the circumstance situation of one's own vehicle is indicated from a point of upward view is a real picture image, is obtained, thus it is possible to display the top plane creating image 7B for grasping the relationship between relative positions to the obstacles (the forward parking vehicle 12, the backward parking vehicle 13, the road shoulder edge 14, and so forth).

Further, it may be possible to display the top plane converting image in stead of the top plane creating image 7B on the right side of the screen 7 of the display 5 by creating the top plane converting image the size of which is the same as the top plane creating image 7B, not the aforementioned top plane converting image 7C of FIG. 8.

In this case, since the whole top plane creating image 7B in which the circumstance situation of one's own vehicle is indicated from a point of upward view is converted to the top plane converting image which is a real picture image, it is possible to display, as if the image is the real world, the top plane creating image 7B for grasping the relationship between relative positions to the obstacles (the backward parking vehicle 13, the road shoulder edge 14, and so forth).

Further, in such a case, in the screen 7 of the display 5, if the picture image 7A and the top plane converting image instead of the top plane creating image 7B are displayed at the same time by splitting the screen, it is possible to see, with reference to the top plane converting image instead of the top plane creating image 7B, the picture image 7A (FIG. 2) for inputting the parking target point and the avoidance point and the picture image 7A (FIGS. 1 and 3) in which the anticipated course R calculated from the steering rudder angle of one's own vehicle is displayed in a duplicate way, thus it is possible to grasp more easily the relationship between relative positions to the obstacles (the backward parking vehicle 13 the road shoulder edge 14, and so forth).

Further, in the parking assist system of the present embodiment, at step S17 of FIG. 4, although the top plane creating image in which the circumstance situation of one's own vehicle is viewed from a higher point of view based on the picture image 7A (FIG. 2) of the back portion of one's own vehicle which is taken by the CCD camera 3 while one's own vehicle is parking is created by means of computer graphics, it is possible, for this point, to modify the top plane creating image, display the updated top plane creating image on the right side of the screen 7 of the display 5 and further display the parking path S of one's own vehicle in a duplicate way, based on the change of the picture image 7A due to the one's own vehicle's moving. In such a case, since the top plane creating image in which the circumstance situation of one's own vehicle is indicated from a point of upward view is replaced with the image corresponding to the current situation of one's own vehicle, it is possible to grasp more easily the relationship between relative positions to the obstacles such as the forward parking vehicle 12, the backward parking vehicle 13, and the road shoulder edge 14.

In the parking assist system of the present invention, while the image creating means creates the top plane creating image, in which the circumstance situation of one's own vehicle is indicated from a point of upward view, is created based on the picture image in which the circumstance situation of one's own vehicle is taken, since the parking path of one's own vehicle is displayed in the top plane creating image in a duplicate way by the displaying means after the first calculating means calculates the parking path from the current position of one's own vehicle to the parking target point if the parking target point, in which one's own vehicle is preferably parked, is input by the first calculating means, it comes to be possible to grasp more easily the relationship between relative positions to the obstacles.

Further, in the parking assist system of the present invention, when one's own vehicle moves, based on the change of the picture image due to one's own vehicle's moving, if the image creating means updates the top plane creating image and further if the displaying means displays the parking path of one's own vehicle in a duplicate way for the updated top plane creating image, the top plane creating image, in which the circumstance situation of one's own vehicle is indicated from a point of upward view, is replaced with the image in accordance with the current situation, thus it comes to be possible to grasp more easily the relationship between relative positions to the obstacles.

Further, in the parking assist system of the present invention, if the first calculating means calculates the parking path by considering the avoidance point which is input by the second input means, the parking path becomes the path in which the avoiding point which one's own vehicle preferably avoids at the time of driving for parking is considered, thus it comes to be possible to grasp more easily the relationship between relative positions to the obstacles.

Further, in the parking assist system of the present invention, if the second calculating means calculates the mobile locus of one's own vehicle and further if the displaying means displays the mobile locus in a duplicate way for the top plane creating image, the mobile locus of one's own vehicle is displayed in addition to the parking path of one's own vehicle in the top plane creating image in which the circumstance situation of one's own vehicle is indicated from a point of upward view and it is possible to recognize the difference between the parking path of one's own vehicle and the mobile path of one's own vehicle, thus it comes to be possible to grasp more easily the relationship between relative positions to the obstacles.

Further, in the parking assist system of the present invention, in the case that the displaying means displays the current position of one's own vehicle by being incorporated with the mobile locus of one's own vehicle, it is possible by taking a look to recognize the distance from the obstacles at the present time to one's own vehicle and the angle of one's own vehicle towards the obstacles at the present time, thus it comes to be possible to grasp more easily the relationship between relative positions to the obstacles.

Further, in the parking assist system of the present invention, the image processing means for converting into top plane converting image in which said picture image is viewed from a point of upward view is included, in the case that the displaying means displays the top plane converting image instead of the top plane creating image or displays by means of a combination of the top plane creating image and the top plane converting image, the image is converted into the top plane converting image in which the whole or a part of the top plane creating image in which the circumstance situation of one's own vehicle is indicated from a point of upward view is a real picture image, it is possible to replace a part or the whole of the top plane creating image in which the circumstance situation of one's own vehicle is indicated from a point of upward view, thus it comes to be possible to grasp more easily the relationship between relative positions to the obstacles.

Further, in the parking assist system of the present invention, in the case that the displaying means displays the image as well as the top plane creating image at the same time by splitting the screen or in the case that the picture image and a combined image of the top plane creating image and the top plane converting image are displayed at the same time by splitting the screen, it is possible to see the image for inputting the parking target point and the avoidance point and the image in which the anticipated course calculated from the steering rudder angle of one's own vehicle is displayed in a duplicate way with reference to the top plane creating image or a combined image of the top plane creating image and the top plane converting image, thus it comes to be possible to grasp more easily the relationship between relative positions to the obstacles.

What is claimed is:

1. A parking assist system for displaying an anticipated course calculated from a steering rudder angle of one's own vehicle on a picture image in a duplicate way in which a circumstance situation of one's own vehicle is displayed, comprising:

image creating means for creating a top plane creating image based on said picture image in which said circumstance situation is indicated from a point of upward view;

first input means for inputting a parking target point which one's own vehicle targets based on said picture image;

first calculating means for calculating a parking path from a current position of one's own vehicle to said parking target point; and displaying means for simultaneously displaying said parking path, said picture image and said top plane creating image in a duplicate way.

2. The parking assist system according to claim 1, wherein:

the displaying means displays the top plane converting image incorporated with the picture image, and displays the parking path taken by a camera.

3. The parking assist system according to claim 2, wherein:

the system further includes a second input means for inputting an avoidance point which said one's own vehicle avoids and said first calculating means for calculating a parking path to said parking target point by avoiding said avoidance point.

4. The parking assist system according to claim 3, wherein:

the system further includes a second calculating means for calculating a mobile locus of said one's own vehicle and said displaying means displays said mobile locus on said top plane creating image in a duplicate way.

5. The parking assist system according to claim 4, wherein:

said displaying means displays a current position of said one's own vehicle by incorporating with said mobile locus.

6. The parking assist system according to claim 5, further comprising:

an image processing means for converting to a top plane converting image in which said picture image is viewed from a point of upward view and said displaying means displaying said top plane converting image instead of said top plane creating image.

7. The parking assist system according to claim 6, wherein:

said displaying means displays said top plane creating image and said picture image or displays said picture image and a combined image of said top plane creating image and said top plane converting image simultaneously by splitting the screen.

8. The parking assist system according to claim 5, further comprising:

an image processing means for converting to a top plane converting image in which said picture image is viewed from a point of upward view and said displaying means displaying by means of a combination of said top plane creating image and said top plane converting image.

9. The parking assist system according to claim 8, wherein:

said displaying means displays said top plane creating image and said picture image or displays said picture image and a combined image of said top plane creating image and said top plane converting image simultaneously by splitting the screen.

10. The parking assist system according to claim 5, wherein:

said displaying means displays said top plane creating image and said picture image simultaneously by splitting a screen.

11. The parking assist system according to claim 2, wherein:
the system further includes a second calculating means for calculating a mobile locus of said one's own vehicle and said displaying means displays said mobile locus on said top plane creating image in a duplicate way.

12. The parking assist system according to claim 11, wherein:
said displaying means displays a current position of said one's own vehicle by incorporating with said mobile locus.

13. The parking assist system according to claim 12, further comprising:
an image processing means for converting to a top plane converting image in which said picture image is viewed from a point of upward view and said displaying means displaying said top plane converting image instead of said top plane creating image.

14. The parking assist system according to claim 12, further comprising:
an image processing means for converting to a top plane converting image in which said picture image is viewed from a point of upward view and said displaying means displaying by means of a combination of said top plane creating image and said top plane converting image.

15. The parking assist system according to claim 1, wherein:
the system further includes a second input means for inputting an avoidance point which said one's own vehicle avoids and said first calculating means for calculating a parking path to said parking target point by avoiding said avoidance point.

16. The parking assist system according to claim 3, wherein:
the system further includes a second calculating means for calculating a mobile locus of said one's own vehicle and said displaying means displays said mobile locus on said top plane creating image in a duplicate way.

17. The parking assist system according to claim 16, wherein:
said displaying means displays a current position of said one's own vehicle by incorporating with said mobile locus.

18. The parking assist system according to claim 17, further comprising:
an image processing means for converting to a top plane converting image in which said picture image is viewed from a point of upward view and said displaying means displaying said top plane converting image instead of said top plane creating image.

19. The parking assist system according to claim 1, wherein:
the system further includes a second calculating means for calculating a mobile locus of said one's own vehicle and said displaying means displays said mobile locus on said top plane creating image in a duplicate way.

20. The parking assist system according to claim 19, wherein:
said displaying means displays a current position of said one's own vehicle by incorporating with said mobile locus.

21. A parking assist system for displaying an anticipated course calculated from a steering rudder angle of one's own vehicle on a picture image in a duplicate way in which a circumstance situation of one's own vehicle is displayed, comprising:
image creating means for creating a top plane creating image based on said picture image in which said circumstance situation is indicated from a point of upward view;
first input means for inputting a parking target point which one's own vehicle targets based on said picture image;
first calculating means for calculating a parking path from a current position of one's own vehicle to said parking target point;
means for calculating an anticipated course of one's vehicle; and
displaying means for simultaneously displaying said picture image, said top plane creating image and said anticipated course in a duplicate way.

22. A parking assist system for displaying an anticipated course calculated from a steering rudder angle of one's own vehicle on a picture image in a duplicate way in which a circumstance situation of one's own vehicle is displayed, comprising:
image creating means for creating a top plane creating image based on said picture image in which said circumstance situation is indicated from a point of upward view;
first input means for inputting a parking target point which one's own vehicle targets based on said picture image;
first calculating means for calculating a parking path from a current position of one's own vehicle to said parking target point;
means for calculating an anticipated course of one's vehicle; and
displaying means for simultaneously displaying said parking path, said picture image, said top plane creating image and said anticipated course in a duplicate way.

* * * * *